Aug. 9, 1949.  W. H. GOTTSHALL  2,478,578
DETACHABLE HOLDER FOR VEHICLE BODIES
Filed May 25, 1948  2 Sheets-Sheet 1
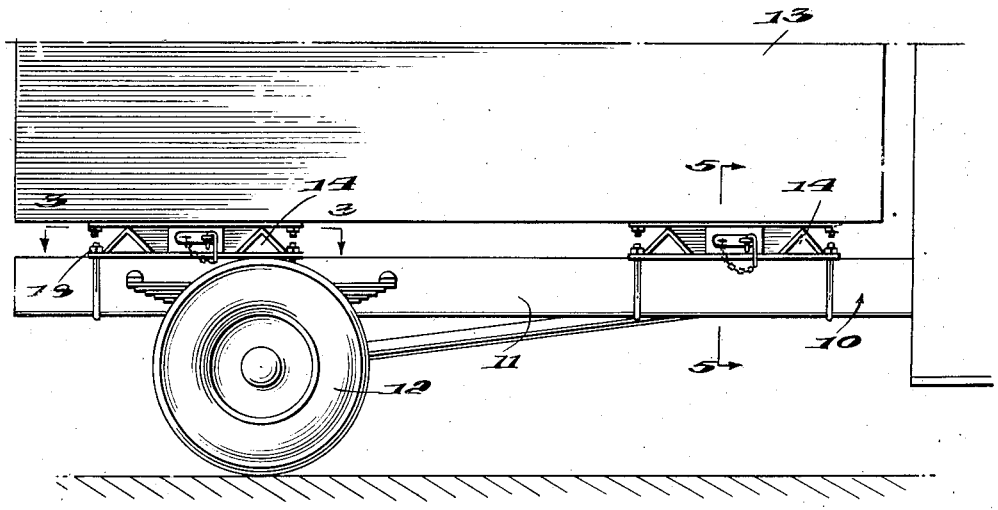
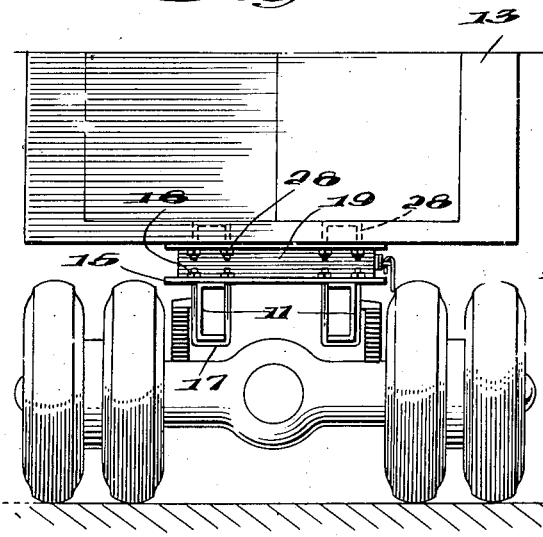
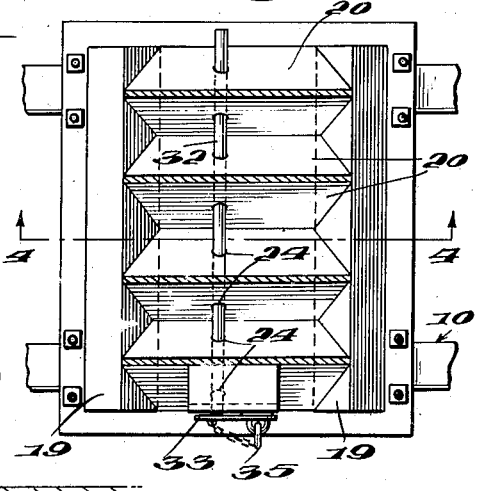
Inventor
WILLIAM H. GOTTSHALL,
By
Attorney Aug. 9, 1949.  W. H. GOTTSHALL  2,478,578
DETACHABLE HOLDER FOR VEHICLE BODIES
Filed May 25, 1948  2 Sheets-Sheet 2
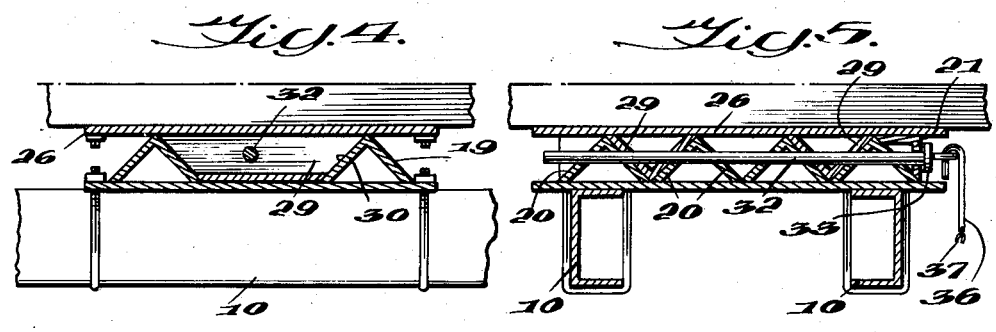
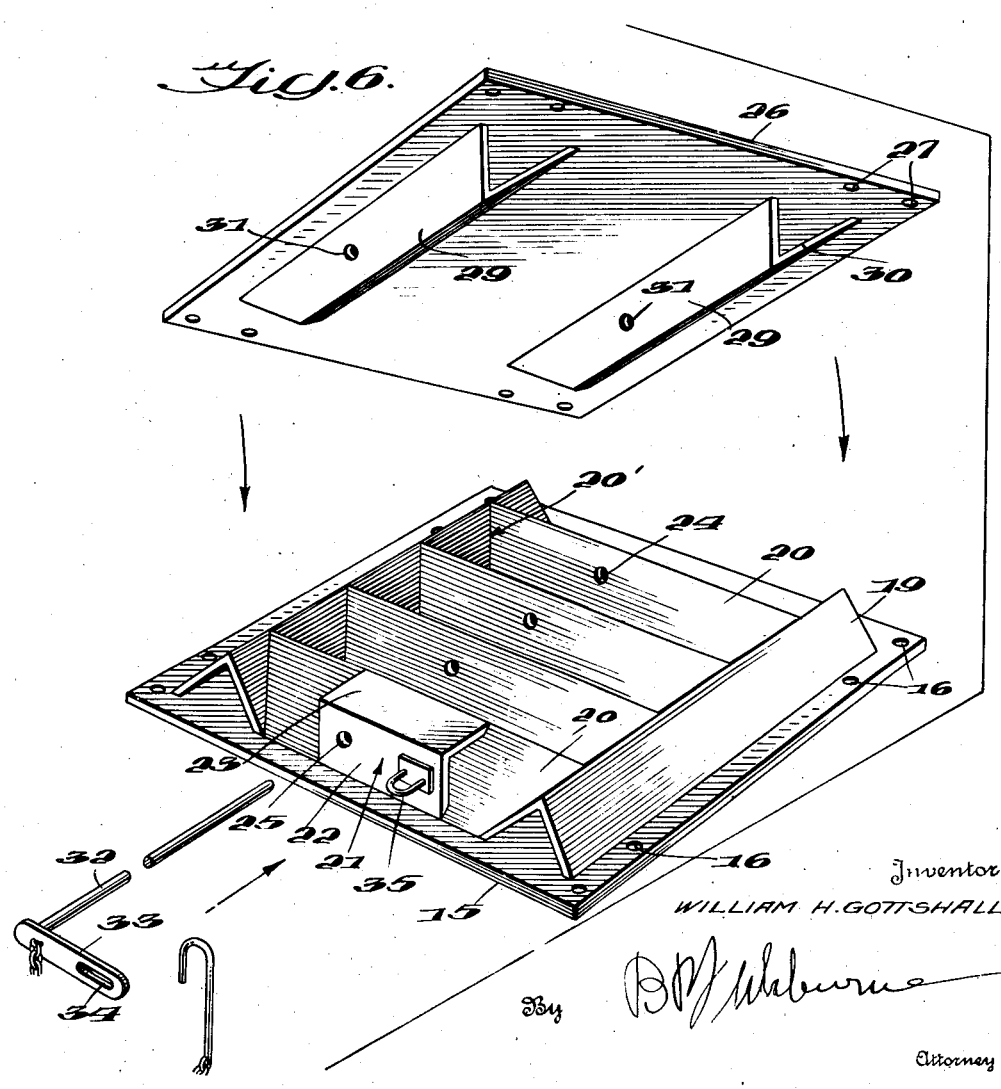
Inventor
WILLIAM H. GOTTSHALL
Attorney Patented Aug. 9, 1949

2,478,578

UNITED STATES PATENT OFFICE 2,478,578

DETACHABLE HOLDER FOR VEHICLE BODIES

William H. Gottshall, Williamsport, Pa.

Application May 25, 1948, Serial No. 29,117

2 Claims. (Cl. 296—35)

My invention relates to means for demountably holding bodies or compartments upon vehicles.

An important object of the invention is to provide means of the above mentioned character including companion interlocking detachable units, one of which may be directly mounted upon the chassis beams of a motor truck, thus eliminating the flat bottom of the motor truck and reducing the weight of the truck to the minimum.

A further object of the invention is to provide a detachable holding means of the above mentioned character which is self-centering when the upper unit is arranged above and lowered into engagement with the lower unit.

A further object of the invention is to provide means for securely locking the assembled units together.

A further object of the invention is to provide means of the above mentioned character which are relatively simple in construction, strong and durable.

Other objects and advantages of the invention will be apparent during the course of the following description.

In the accompanying drawings, forming a part of this application, and in which like numerals are employed to designate like parts throughout the same, Figure 1 is a side elevation of a vehicle embodying my invention, Figure 2 is an end elevation of the same, Figure 3 is a horizontal section taken on line 3—3 of Figure 1, Figure 4 is a vertical longitudinal section taken on line 4—4 of Figure 3, Figure 5 is a vertical transverse section taken on line 5—5 of Figure 1, and, Figure 6 is an exploded perspective view of the holding device.

In the drawings, wherein for the purpose of illustration is shown a preferred embodiment of my invention, the numeral 10 designates the chassis of a truck, including longitudinal beams 11. This chassis is supported in the usual manner by rear wheels 12 and front wheels, not shown. The usual platform mounted upon the chassis beams 11 is purposely omitted, to save weight. Mounted above the chassis beams 11 is a body or compartment 13.

Arranged between the body or compartment 13 and the chassis beams 11 are longitudinally spaced releasable locking devices 14, which are identical. Each locking device comprises a lower unit including a plate 15, having pairs of openings 16, near their transverse edges. The plate 15 rests upon the chassis beams 11 and extends transversely of these beams, and U-bolts 17 surround the chassis beams 11 and pass through the openings 16 and carry nuts 18, which clamp the plate 15 to the beams 11, as shown. Extending transversely of the chassis beams 11 are transverse ribs or tongues 19, which are triangular in cross-section and taper upwardly and have their apices at the top. These tongues 19 are formed of inverted angle irons, and the webs of each angle iron are arranged at an angle of 90 degrees. The transverse tongues 19 are arranged near and inwardly of the transverse edges of the plate 15 and inwardly of the openings 16. The transverse tongues 19 are rigidly secured to the upper face of the plate 15 by welding or the like. Arranged between the transverse tongues 19 are longitudinal tongues 20. The longitudinal tongues are formed of angle irons and the webs of each angle iron are disposed at an angle of 90 degrees with respect to each other. Each tongue 20 is transversely tapered and its apex is arranged uppermost. The longitudinal tongues have their bases mounted upon the upper face of the plate 15 and are rigidly secured thereto by welding or the like. The tongues 20 are disposed in substantial contacting relation with each other at their bases. The ends of the upwardly tapering tongues 20 are beveled, as shown at 20', corresponding to the taper of the transverse tongues 19 and are rigidly secured to the faces of the tongues 19, by welding or the like. The numeral 21 designates an angle iron, including a vertical web 22 and a horizontal web 23, the longitudinal edges of these webs engaging the adjacent longitudinal tongue 20 and rigidly secured thereto by welding or the like. The upwardly tapered longitudinal tongues 20 are provided with pairs of openings 24, all of which are in longitudinal alignment, and the web 22 has a transverse opening 25, in alignment with the openings 24, for a purpose to be described.

The holding device further comprises an upper unit including a plate 26, having openings 27 near its transverse edges, and these openings are adapted to receive bolts 28, rigidly securing the plate 26 to the bottom of the body or compartment 13. Arranged beneath the plate 26 are longitudinal tongues 29, triangular in cross-section, tapering downwardly and having their apices arranged lowermost. Each tongue 29 is formed from an angle iron including webs disposed at an angle of 90 degrees. The tongues 29 have their bases arranged uppermost and are rigidly secured to the plate 26 by welding or the like. The tongues 29 are adapted to fit between pairs of tongues 20, and the ends of the tongues 29 are beveled, at 30, corresponding to the inclination of the faces of the transverse tongues 19. The tongues 29 have pairs of openings 31 adapted for alignment with the openings 24. The tongues 29 are adapted to move into the grooves between the tongues 20 and the faces of the tongues 29 contact with the faces of the tongues 20, while the beveled ends 30 contact with the inclined faces of the tongues 19. The action of the tongues, when the units are assembled, is to center the plate 26 transversely and longitudinally with respect to the plate 15.

Adapted for co-action with the upper and lower units, to lock them together, is a locking rod 32 for insertion within the openings 24 and 31. The locking rod 32 has a hasp 33 rigidly secured thereto and this hasp has a slot 34 for receiving a staple 35, rigidly secured to the web 22. The staple 35 passes through the slot 34 and is retained in this slot by a hook 36, secured to a chain 37, attached to the hasp 33. Other means may be employed to retain the staple within the opening 34.

The plates 15 of the lower units are rigidly mounted upon the chassis beams 11, while the plates 26 of the upper units are rigidly secured to the bottom of the body or compartment 13, as explained. The body or compartment 13 is raised to a position above the chassis beams 11, and is then lowered into proximity to such beams. As the upper plate 26 of each locking device approaches the companion lower plate 15, the longitudinal tongues 29 interfit with the longitudinal tongues 20 and thus guide the body or compartment 13 downwardly and transversely center the same with respect to the chassis beams. The inclined ends 30 of the tongues 29 engage the tongues 19 and thus longitudinally center the body or compartment 13 with respect to the chassis beams. When the body or compartment reaches the lowermost position, the tongues 29 rest upon the tongues 20, and the tongues 29 are locked to the tongues 20 by inserting the locking rod 32 through the openings 24 and 31. This locking rod 32 is held against displacement by passing the staple 35 into and through the slot 34 and retaining the staple within the slot by means of the hook 36 or the like.

In view of the foregoing description, it is apparent that two of the locking devices 14 are employed to securely detachably mount the body or compartment 13 upon the chassis beams 11. The usual chassis platform is entirely omitted, thus reducing the weight of the vehicle to the minimum. While I have shown the locking devices as applied to the body or compartment and to the chassis of an automobile, it is obvious that the lower units of the locking devices may be mounted upon other vehicles, such as railway cars, whereby the body or compartment may be mounted upon such other vehicle.

It is to be understood that the form of my invention herewith shown and described is to be taken as the preferred example of the same and that various changes in the shape, size and arrangement of parts may be resorted to without departing from the spirit of my invention or the scope of the subjoined claims.

Having thus described my invention, I claim:

1. A device for holding a body or compartment upon a vehicle, comprising a lower plate to be secured to the chassis of the vehicle, a pair of transverse inverted V-shaped ribs mounted upon the lower plate adjacent to its ends and rigidly secured thereto and extending throughout the major portion of the width of the plate, a plurality of longitudinal inverted V-shaped ribs mounted upon the lower plate between the transverse ribs and rigidly secured to the lower plate and having inclined ends engaging the sides of the transverse ribs, the longitudinal inverted V-shaped ribs forming a group extending throughout substantially the entire length of the transverse ribs, the longitudinal ribs in the group having their bases contacting, the longitudinal ribs being provided in their sides with aligned openings, an upper plate to be secured to the compartment, a pair of longitudinal V-shaped ribs arranged beneath the upper plate adjacent to its longitudinal edges and having their ends longitudinally beveled, the upper longitudinal V-shaped ribs engaging between pairs of the lower longitudinal inverted V-shaped ribs and having their longitudinally beveled ends engaging the sides of the lower transverse ribs, the upper longitudinal ribs having aligned openings in their sides to be brought into registration with the openings of the lower longitudinal ribs, and a rod for insertion through all of said openings to lock the upper and lower longitudinal ribs together against vertical separation.

2. A device for holding a body or compartment upon a vehicle, comprising a lower plate to be secured to the chassis of the vehicle, a pair of elongated transverse inverted V-shaped ribs mounted upon the lower plate adjacent to its ends and rigidly secured thereto and extending throughout the major portion of the width of the plate, a plurality of elongated longitudinal inverted V-shaped ribs mounted upon the lower plate between the transverse ribs and rigidly secured to the lower plate and having inclined ends engaging the sides of the transverse ribs, the longitudinal inverted V-shaped ribs forming a group extending throughout substantially the entire length of the transverse ribs, the longitudinal ribs in the group having their side edges disposed in close relation, the longitudinal ribs being provided in their sides with aligned openings, an upper plate to be secured to the compartment, a pair of elongated longitudinal V-shaped ribs arranged beneath the upper plate adjacent to its longitudinal edges and having their opposite ends longitudinally beveled, the upper longitudinal V-shaped ribs engaging between pairs of the lower longitudinal inverted V-shaped ribs and having their longitudinally beveled ends engaging the inner opposed sides of the lower transverse ribs, the upper longitudinal ribs having aligned openings in their sides to be brought into alignment with the openings of the lower longitudinal ribs, and a rod for insertion through all of said openings to lock the upper and lower longitudinal ribs together against vertical separation.

WILLIAM H. GOTTSHALL.

REFERENCES CITED

The following references are of record in the file of this patent:

UNITED STATES PATENTS

| Number | Name | Date |
|---|---|---|
| 928,520 | Huysmans | July 20, 1909 |
| 2,030,862 | Fitch | Feb. 18, 1936 |
| 2,117,067 | Ludington | May 10, 1938 |
| 2,144,042 | Armington | Jan. 17, 1939 |